UNITED STATES PATENT OFFICE.

GEORGE E. BEHRENS, OF BROOKLYN, NEW YORK, ASSIGNOR TO OBADIAH B. REYNOLDS AND JOHN SMALLEY, OF BOUNDBROOK, NEW JERSEY.

IMPROVEMENT IN ANTI-FRICTION COMPOUNDS.

Specification forming part of Letters Patent No. 189,684, dated April 17, 1877; application filed January 16, 1877.

*To all whom it may concern:*

Be it known that I, GEORGE E. BEHRENS, of Brooklyn, in the county of Kings and State of New York, have invented or discovered a new and useful composition or material especially adapted for use for journal-boxes or their linings, and for similar purposes and uses; and I do hereby declare that the following is a full, clear, and exact description thereof, and of the mode or manner of compounding and making the same.

The object of my invention is the production of a composition or material suitable to be used for frictional surfaces, journal-boxes or their linings, and for similar purposes, which shall have and possess requisite solidity and hardness, and which will not be injured by any heat produced by ordinary friction, and which will require or demand in its use but little or no lubricating material.

The nature of my invention consists in combining with metals and their alloys graphite or plumbago, and in such a manner that the two materials will be thoroughly mixed or combined with each other, and permanently united, or, so to speak, welded together, thereby securing, by means of the metal, all required hardness and solidity, and, by the use of the graphite, a greater or less lubricating quality, so as to dispense partially or wholly with other lubricants.

Any of the metals or their alloys ordinarily used for journal-boxes, &c., may be made use of; but I prefer the use of, and have obtained the most satisfactory results from, such metals as have a less decidedly sharp or crystalline structure, or are softer in their character, as zinc, tin, copper, lead, Babbitt metal, antimony, aluminum, &c.

The compounding or mixing of such metals and the graphite may be effected in any suitable manner; but I have found both of the following methods feasible and satisfactory.

The metal may be first melted, and then the graphite mixed therewith, and the whole stirred until the two are thoroughly mixed and incorporated with each other. When the mass has become sufficiently cooled it is broken and ground or reduced, preferably, to about the fineness of coarse gunpowder, forming a granulated mass of mixed metal and graphite; or, instead of melting the metal, and when in such condition mixing the graphite with it, the metal may be broken or reduced by itself, and then the graphite mixed with it.

The mixed metal and graphite, or the metal, need not necessarily be reduced as finely as above mentioned; but, if in a coarse condition, the pressing hereafter mentioned will be less easily and quickly performed.

The mixing of the metal and the graphite having been effected in either of the modes above described, or in any suitable manner, the compound is placed in strong mold or dies, formed in the shape of the required journal-box or lining, or friction-surface, and is there subjected to pressure sufficient to bring the compound into a solid compact mass, and unite or weld it together. Such pressure may be applied to the mass in the molds while the molds and the mass are cold; or the molds may be heated by steam, or in any other way, so as to soften or partially melt the metal.

When the molds are thus heated less pressure will be required, and for a less length of time, to firmly compress, or mold the mass than when the molds and material are pressed in a cold state. The compound or composition, having been thus pressed, is ready for use.

The relative proportion of the metal and the graphite can be varied according to the particular use to which, or the conditions under which, the completed product is to be used. The smaller the proportion of the graphite the less perfect will be the lubricating qualities of the new material, and a larger proportion of such mineral will have a tendency to render the product of less strength, or less solid and compact.

For general uses and purposes I have found that the use of from one-half to two-thirds, by bulk, of graphite, as compared with the metal used, forms a compound which, when mixed and pressed, as before described, is sufficiently hard and solid, and, at the same time, possesses all necessary lubricating qualities, when used under ordinary circumstances and conditions.

For some uses, or when the prepared material is to be used under some conditions, twenty per cent., or even less, of the graphite will be sufficient; though in such case, and particularly when friction is increased by rapid revolution, the use of some foreign lubricating substance may be necessary or desirable. Such material or compound may be molded and pressed into sheets, plugs, tubes, linings for boxes, and in any form desired.

What is claimed is—

The new material or compound composed of metals or their alloys, mixed and combined with graphite or plumbago, substantially as specified, and in the proportions mentioned, and then molded and pressed into sheets, plugs, tubes, or such other form as required, substantially as described.

GEO. E. BEHRENS.

Witnesses:
S. D. LAW,
JAMES F. LAW.